United States Patent [19]
Schreyer

[11] 3,974,640
[45] Aug. 17, 1976

[54] COUPLING LINK

[75] Inventor: Kenneth D. Schreyer, Clarence, N.Y.

[73] Assignee: Columbus McKinnon Corporation, Tonawanda, N.Y.

[22] Filed: Dec. 18, 1975

[21] Appl. No.: 641,902

Related U.S. Application Data

[63] Continuation-in-part of Ser. No. 591,946, June 30, 1975, abandoned.

[52] U.S. Cl. .................................................. 59/85
[51] Int. Cl.² ........................................ F16G 15/04
[58] Field of Search ............... 59/85, 86, 88, 93, 90, 59/91, 78, 84

[56] References Cited
UNITED STATES PATENTS

| | | | |
|---|---|---|---|
| 2,369,344 | 2/1945 | Ehmann | 59/86 |
| 2,406,712 | 8/1946 | Robbins | 59/85 |
| 2,972,223 | 2/1961 | Devonshire | 59/88 |

FOREIGN PATENTS OR APPLICATIONS

| | | | |
|---|---|---|---|
| 271,378 | 5/1927 | United Kingdom | 59/91 |

Primary Examiner—C.W. Lanham
Assistant Examiner—Gene P. Crosby
Attorney, Agent, or Firm—Bean & Bean

[57] ABSTRACT

A coupling link for field/factory assembly of chain lengths and/or attachments thereto; and/or for repairing broken chains or to couple lengths of chain together whenever desired; said coupling link comprising two half link units each of which comprises an overlay/underlay assembly of two or more relatively nested complemental-configured half-link shaped members all of which are stamped out from sheet/plate stock and formed into generally U-shaped sectional form, the paired components thereof being complementarily shaped and internested together. Thus, where the coupling link is under tension loadings the bowed portions of contiguous members yield into mutually reinforcing shapes. Said half-link shaped members have apertured terminal ear portions interdigitally mounted upon a common interconnecting pin; thereby spreading the operational shear loads on the pin.

14 Claims, 11 Drawing Figures

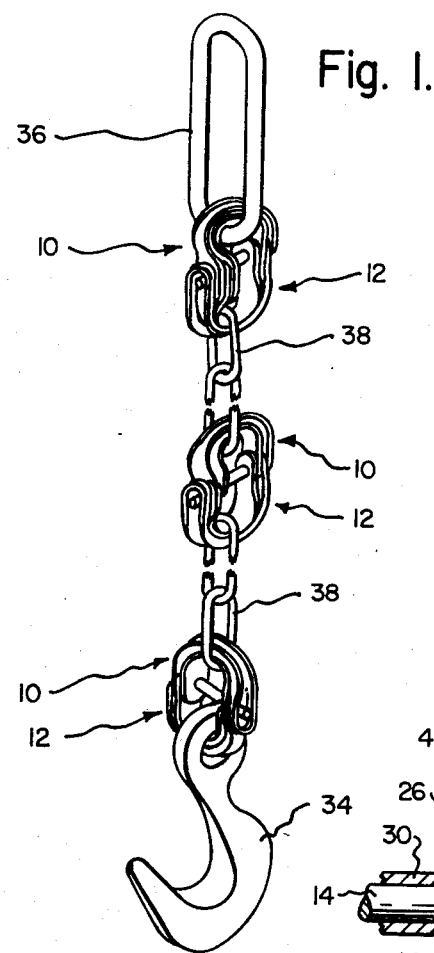
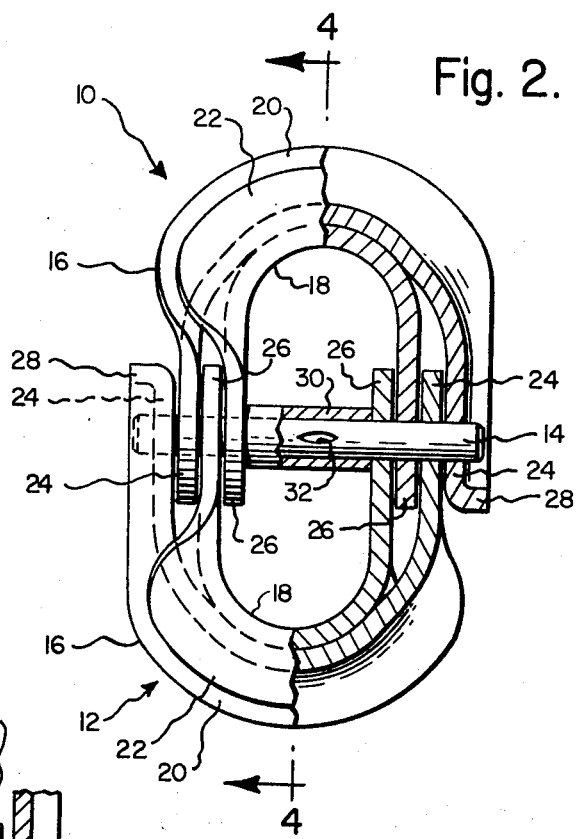
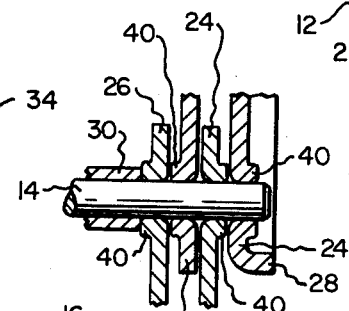
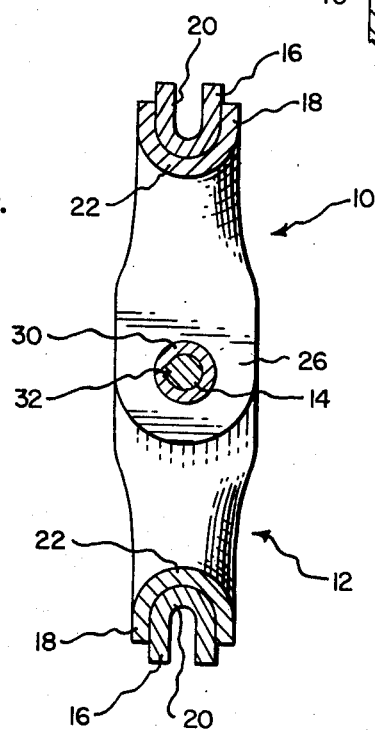
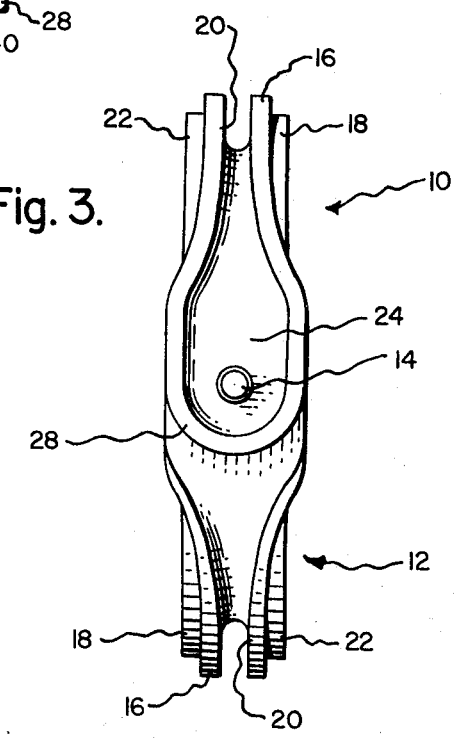

COUPLING LINK

CROSS REFERENCE TO RELATED APPLICATION

This application is a continuation-in-part of my copending application Ser. No. 591,946, filed June 30, 1975, and now abandoned.

BACKGROUND OF THE INVENTION

This invention relates to improvements in chain coupling links, such as are adapted for use in the field or shop to couple short lengths of chain together, and/or to interconnect lengths of chain and accessories or other items thereto; and/or to repair broken chains and the like. Such "coupling" links find utility, for example, in the assembly of short lengths of chain together into chains or larger lengths; or for the purpose of attaching hooks or eyes, or other such accessories, to load carrying chains. Also, whenever chains are used under typical industry working conditions which subject them to wear and load tension stresses; breakage of individual links due to wear-outs/overloads sometimes occur. In such cases a so-called "coupling link" may be employed to recouple the ends of the two sections of chain which are still useful.

References to a variety of coupling link arrangements which have been previously proposed for such purposes are disclosed for example in U.S. Pat. Nos. 3,104,519; 3,373,560; 3,453,822 and 3,846,978. It is to be noted that such prior art coupling links are typically constructed in the form of metal forgings as are the conventional forged type chain links to which they are coupled. However, it should also be noted that coupling link parts have also been previously stamped out of sheet metal, as shown for example in U.S. Pat. No. 2,406,712.

OBJECTS AND ADVANTAGES OF THE INVENTION

The prime object of the present invention is to provide a coupling link which is not only as strong and durable as are coupling links of the prior art; but which also is much less expensive to manufacture and is of lighter weight. When operating under load, the coupling device of the invention relatively adjusts its load carrying parts in novel manner in accordance with and to the configurations of the load carrying devices to which it is connected. Thus, compared to coupling links of the prior art the coupling link of the present invention avoids with improved facility imposition of stress concentrations upon the devices to which it is connected, as well as upon the coupling link structure, per se.

THE DRAWING

By way of example, an embodiment of the invention is illustrated in the accompanying drawings, wherein:

FIG. 1 is a fragmentary perspective view; showing in the single drawing figure a variety of typical uses of coupling links of the present invention in connection with a typical load chain installation;

FIG. 2 is an enlarged scale, front elevational view partly in section; showing a coupling link construction of the present invention;

FIG. 3 is a side elevational view thereof;

FIG. 4 is a sectional view taken as indicated by line 4—4 of FIG. 2;

FIG. 5 is a fragmentary view corresponding to a portion of FIG. 2 but showing a modified form of the link construction;

Figure 6:
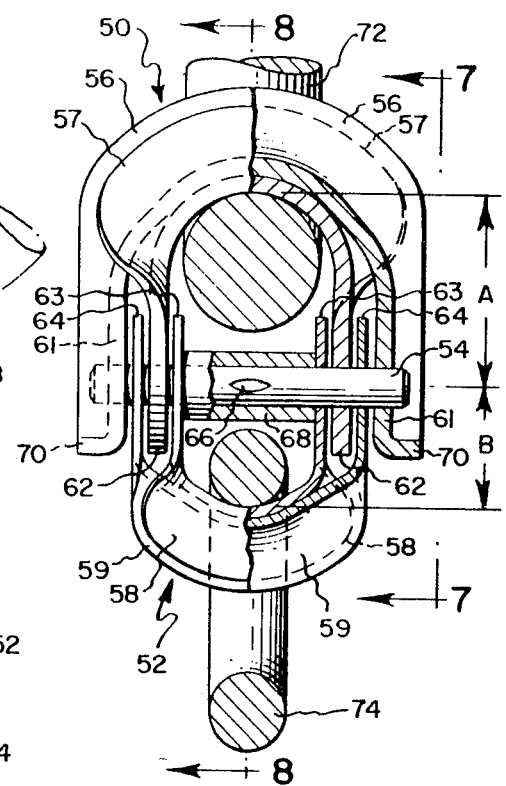
FIG. 6 is a view corresponding to FIG. 2, showing a modified form of coupling link of the present invention.
Figure 10:
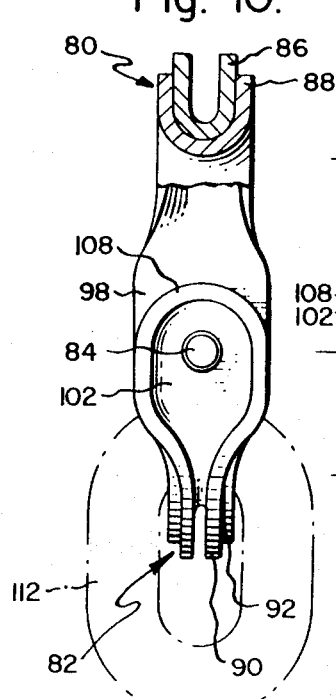
Figure 9:
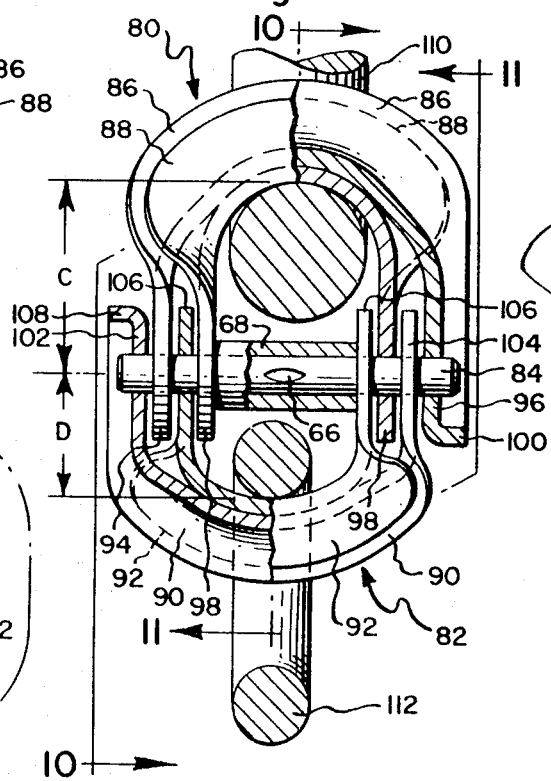
Figure 11:
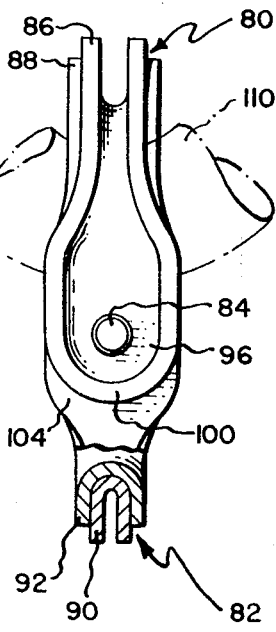

FIG. 9 corresponds to FIGS. 2 and 6, showing still another modified form of the invention;

FIG. 10 is a parti-elevational/sectional view taken as suggested by line 10—10 of FIG. 9; and FIG. 11 is a parti-elevational/sectional view taken as suggested by line 11—11 of FIG. 9.

As illustrated herein by way of example at FIGS. 1–5, the coupling device of the invention includes a pair of identical half-link units designated generally by the numerals 10, 12 which are interconnected by a pin 14. As shown herein, the half-link units in each case comprise a relatively nested identical pair of generally U-shaped, strap-like members 16, 18 (FIG. 2); these members 16, 18 being formed throughout their bowed end portions 20, 22 into complementing U-shaped sectional configurations (FIGS. 3, 4) while their leg portions terminate in flat, parallel disposed ear portions 24, 26 (FIG. 2). The ear portions 24, 26 are apertured to receive the pin 14, thus providing for assembly of the device, as will be described more fully hereinafter.

As illustrated at 28, the outermost ear portions 24 of the members 16—16 are peripherally flanged to substantially circumscribe the projecting ends of the pin 14; thereby protecting the ends of the pins from physical hazards such as blows tending to accidentally dislodge the pin. As shown at 30, the pin 14 may be retained in the proper position for example by means of a retainer sleeve (such as shown for example in U.S. Pat. No. 2,972,223) the pin being notched as indicated at 32 so that when the pin is driven through the sleeve 30 it is thereby fastened against accidental dislodgement. However, any other suitable device may be employed to retain the pin 14 in position.

Whereas the drawing herewith illustrates a form of coupling device of the invention wherein each half-link unit comprises only a pair of internested members, it is to be understood that any other preferred number of internesting members may be employed. The essence of the invention is to construct each half-link unit of the coupling device to comprise essentially a laminate of strap-like members which are (substantially throughout the bowed portions thereof) U-shaped both when viewed in elevation and in section; and which internest in complementing configurations substantially throughout their bowed portions. Preferably, these members will be formed of somewhat yieldable, high tensile strength, sheet or plate stock material. In some instances the prerequisites will call for use of steel or other metal as the stock material; but it is to be understood that the invention is also applicable to use of other stock materials such as plastics, etc. It is by virtue of this arrangement that the bowed portions of the individual lamina can systematically adjust into cooperating configurations when under a large variety of service loading conditions, so as to equalize the distribution of load responsive tension and shear forces throughout the entire structure of the coupling device.

More specifically, it will thus be apparent that stress concentrations in the bowed end portions of the device will be minimized by reason of the capabilities of these sections of the device to adapt in an improved manner configuration-wise to the shapes of the load transmitting devices to which they are coupled. Such accommodations are accomplished incidental to uniform distribution of loads throughout the structure, whereby a lesser amount (and weight) of metal is required in the construction of a coupling device of the present invention to meet safety specifications, than in the case of a coupling device of the prior art. By virtue of this same performance characteristic the coupling device of the present invention operates to minimize stress concentrations on different parts of the load transmitting devices to which it is coupled, to their advantage.

Furthermore, because the interdigitated ears 24, 26 of the device of the invention separately apply (in alternate relation) only fractional portions of the overall service loadings upon the pin 14, the pin is required to withstand a substantially lower shear loading at any one section thereof compared to the shear resistant requirements for the corresponding pins of prior art coupling devices. Also, inasmuch as the inner half-link shaped members usually take the initial stresses when coming under load and yield somewhat until backed up by the outer half-link shaped members, it is preferred to make the inner half-link shaped members of somewhat thicker stock material than is used for the outer half-link shaped members. This is to avoid premature tensile failure of the inner half-link shaped members, and to provide an improved cooperation between the inner and outer members so as to gain maximum operating strength vs weight advantages for the entire unit.

FIG. 1 of the drawing herewith illustrates several typical uses of a coupling link as referred to hereinabove; the coupling links of the present invention being identified by the numerals 10, 12 being employed for various purposes in connection with a single load chain. By way of example, at the lower portion of the figure a coupling link 10, 12 is shown as being used to interconnect a load hook 34 and a link 38 of the standard type load chain. Intermediately of the figure a coupling link 10, 12 is shown as being used to interconnect two separate portions of the load chain. At the upper end of the figure a coupling link 10, 12 is shown as being used to interconnect the upper end of the load chain to a standard type coupling link 36.

It is to be understood that the holes through the ear portions of the members 16, 18 for receiving the pin 14 may be formed by any suitable shop practice such as drilling, punching, or the like, and may be either preformed in the members before assembly or drilled/punched therethrough after the half-link units are arranged in relative assembly position. However, as illustrated at FIG. 5 of the drawing herewith, the openings through the ear portions of the members may be beneficially formed by a punching process so as to displace metal outwardly peripherally of the openings therethrough as illustrated at 40 in the drawing herewith. Thus, the flange portions 40 which are so-formed on the ear portions operate to spread the shear loads applied to the pin 14 to its substantial advantage. Flange portions such as illustrated at 40 at FIG. 5 may be provided on either or both of the inner and outer half-link shaped members, as may be preferred. Also, such flanges may be provided by any other suitable shop practice such as by coining or forging operations or the like.

Figure 8:
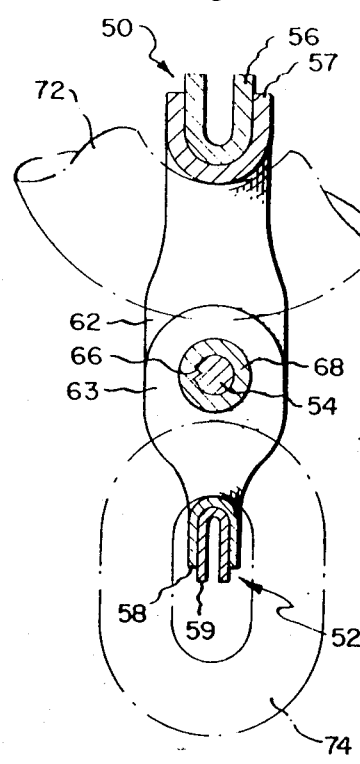
FIG. 8 is a fragmentary sectional view taken as suggested by line 8—8 of FIG. 6.
Figure 7:
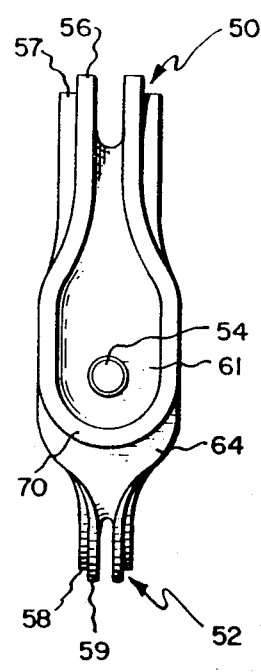
FIG. 7 is a side elevational view of the link construction of FIG. 6.

FIGS. 6–8 of the drawing herewith illustrate a modified form of the invention wherein the coupling device includes a pair of somewhat unlike half-link units designated generally by the numerals 50, 52 which are interconnected by a pin 54. Again, as shown by way of example in this case the half-link units each comprises a relatively nested pair of generally U-shaped strap-like members 56, 57 and 58, 59, respectively (FIGS. 7, 8); the members 56–59 being formed throughout their bowed end portions into mutually complementing U-shaped sectional configurations, while their leg portions terminate in flat and parallel disposed ear portions 61, 62 and 63, 64, respectively.

As shown in FIGS. 6, 8, the pin 54 may be notched as shown at 66, and a retaining sleeve 68 mounted thereon to forestall unintended dislodgements of the pin, as explained hereinabove. Also, as shown in FIGS. 6–7, the flat end portions 61—61 of the member 56 are marginally flanged outwardly as illustrated at 70 to protect the ends of the pin 54 from accidental external blows such as would tend to dislodge it.

Note that the "reach" of the unit 50 as illustrated at "A" (FIG. 6) is substantially greater than the "reach" of the unit 52 as illustrated at "B" and that the span of unit 50 is also larger than the span of unit 52; thus adapting the coupling device of the invention to accommodate two differently sized chain links as illustrated at 72 and 74, as best shown in FIGS. 6, 8. Because of the flat-curve nature of the central portions of the bowed ends of the members 58, 59, lower stresses are developed in their extreme fibers under operating conditions. Therefore, if desired, these members may be formed of somewhat lighter stock sheet material than in the case of the members 56, 57, while providing equal strength for the units of the overall device. This is also true because of the fact that the span of the unit 52 is shorter than the span of the unit 50. Thus, maximum utility of the material employed in assembly of the coupling device is effected, while minimizing the weight and cost of the device.

FIGS. 9–11 of the drawing illustrate still another modified form of the invention wherein the device includes half-link units designated generally by the numerals 80, 82 which are interconnected by a pin 84. Each unit comprises a relatively nested pair of generally U-shaped strap members 86, 88 and 90, 92, respectively. The member 86 terminates in flat leg portions 94, 96, whereas the member 88 terminates in like parallel flat leg portions 98—98. The leg portion 96 is outwardly flanged as indicated at 100 to protect one end of the pin 84 from external blows tending to accidentally dislodge it, as explained hereinabove. The member 90 terminates in flat leg portions 102, 104, and the member 92 terminates in flat leg portions 106—106. The flat leg portion 102 is outwardly flanged as indicated at 108 to protect the other end of the pin 84 from external blows, as explained hereinabove. As in the case of FIGS. 4–8, the reach "C" of the unit 80 is longer than the reach "D" of the unit 82 to adapt the device to accommodate chain links 110, 112 of different sectional diameters. Here again, the flat-curve nature of the mid-bowed portions of the members 90, 92 reduce the extreme fiber stresses therein when under load, whereby these members may be made of somewhat lighter gauge material than in the case of the members 86, 88.

I claim:

1. A coupling link comprising two substantially U-shaped assembly units each having bowed intermediate portions extending into generally parallel leg portions apertured in transversely aligned relation, and a mutually connecting pin slide-fitted through said apertured leg portions thereby providing a complete coupling link comprising two half-link portions hingedly interconnected;

said assembly units each comprising a laminate of two or more members formed of strap-like material, including an inner member and an outer member shaped to interfit to provide the aforesaid assembly units, the bowed portions of said members of each of said assembly units being shape-yieldable under stress and of generally interfitting U-shaped sectional configurations.

2. A coupling link as set forth in claim 1 wherein the leg portions of said members of each of said assembly units are disposed in parallel spaced relation, and wherein the leg portions of the members of the said two assembly units are interdigitally disposed in connected relation upon said pin, whereby the shear loads on said pin incidental to tension loadings on said coupling link are distributed between different lengthwise portions of said pin.

3. A coupling link as set forth in claim 1, wherein said members are formed of high tensile strength, yieldable, sheet metal.

4. A coupling link as set forth in claim 2, wherein said members are formed of high tensile strength, yieldable, sheet metal.

5. A coupling link as set forth in claim 1, wherein the outermost of said apertured leg portions are laterally flanged outwardly to protect the outer ends of said connecting pin against external blows tending to accidentally dislodge it.

6. A coupling link as set forth in claim 2, wherein the outermost of said apertured leg portions are outwardly flanged to protect the outer ends of said connecting pin against external blows tending to accidentally dislodge it.

7. A coupling link as set forth in claim 1, wherein the inner members of said units are formed of stock material which is thicker than the stock material from which the outer members are formed.

8. A coupling link as set forth in claim 2, wherein the inner members of said units are formed of stock material which is thicker than the stock material from which the outer members are formed.

9. A coupling link as set forth in claim 5, wherein the apertured leg portions of said members are laterally flanged to provide enlarged surfaces bearing against said connecting pin.

10. A coupling link as set forth in claim 6, wherein the apertured leg portions of said members are laterally flanged to provide enlarged surfaces bearing against said connecting pin.

11. A coupling link as set forth in claim 1, wherein one of said U-shaped units is of longer reach than the other of said units.

12. A coupling link as set forth in claim 11 wherein said longer reach unit is of larger span than the other of said units.

13. A coupling link as set forth in claim 11 wherein said shorter reach unit members are formed of lighter stock sheet material than are the members of the other of said units.

14. A coupling link as set forth in claim 12 wherein said shorter reach unit members are formed of lighter stock sheet material than are the members of the other of said units.

* * * * *